United States Patent
Kato et al.

(10) Patent No.: US 10,491,142 B2
(45) Date of Patent: Nov. 26, 2019

(54) SERVOMOTOR DRIVE DEVICE

(71) Applicant: FUJI CORPORATION, Chiryu-shi (JP)

(72) Inventors: Naohiro Kato, Okazaki (JP); Mizuho Yamamoto, Okazaki (JP)

(73) Assignee: FUJI CORPORATION, Chiryu-shi (JP)

( * ) Notice: Subject to any disclaimer, the term of this patent is extended or adjusted under 35 U.S.C. 154(b) by 0 days.

(21) Appl. No.: 15/740,389

(22) PCT Filed: Jul. 2, 2015

(86) PCT No.: PCT/JP2015/069125
§ 371 (c)(1),
(2) Date: Dec. 28, 2017

(87) PCT Pub. No.: WO2017/002257
PCT Pub. Date: Jan. 5, 2017

(65) Prior Publication Data
US 2018/0191275 A1    Jul. 5, 2018

(51) Int. Cl.
*H02P 1/16* (2006.01)
*B25J 9/16* (2006.01)
(Continued)

(52) U.S. Cl.
CPC .......... *H02P 1/16* (2013.01); *G01D 5/2451* (2013.01); *G05B 19/0428* (2013.01);
(Continued)

(58) Field of Classification Search
CPC ......... B25J 9/1692; G05B 19/232; H02P 1/16
See application file for complete search history.

(56) References Cited

U.S. PATENT DOCUMENTS 4,988,935 A * 1/1991 York .................... G05B 19/232
                                                    318/561
5,331,232 A * 7/1994 Moy ..................... B25J 9/1692
                                                    318/568.1
(Continued)

FOREIGN PATENT DOCUMENTS

JP   2005-348475 A   12/2005
JP   2007-114933 A    5/2007
JP    2013-73351 A    4/2013

OTHER PUBLICATIONS

Datalogic Automation; "Datalogic Absolute Encoders AMT58 EtherCAT", May 7, 2014 (May 7, 2014), XPQ554S7192, Via Lavino, 285 40050—Monte S. Pietro Bologna—Italy Retrieved from the Internet; URLMp;//www,cfrwtrxom/PDF/DataSensor/ Datalogic-AMT58" EtherCAT.pdf (Year: 2014).*
(Continued)

*Primary Examiner* — Bickey Dhakal
*Assistant Examiner* — Cortez M Cook
(74) *Attorney, Agent, or Firm* — Oblon, McClelland, Maier & Neustadt, L.L.P.

(57) ABSTRACT

A servo amplifier including an encoder for detecting rotation of a servomotor (11), a servo amplifier (13) for performing feedback control of the rotation of the servomotor based on a count value (hereinafter referred to as an "encoder value") of the encoder, and an amp control section (17) for controlling operation of the servo amplifier, wherein the amp control section sends an initialization instruction for initializing the encoder to the servo amplifier in a state of fixed cycle connection over a servo network between the servo amplifier and the encoder when an error occurs with the encoder. The servo amplifier performs initialization of the
(Continued)

encoder without disconnecting the servo network when receiving the initialization instruction sent from the amp control section.

12 Claims, 3 Drawing Sheets

(51) Int. Cl.
G05B 19/23 (2006.01)
H02P 29/00 (2016.01)
H02P 21/20 (2016.01)
G01D 5/245 (2006.01)
G05B 19/042 (2006.01)
G05D 3/12 (2006.01)
G07C 3/00 (2006.01)
G05B 19/21 (2006.01)
G05B 19/4062 (2006.01)

(52) U.S. Cl.
CPC ............... *G05B 19/21* (2013.01); *G05D 3/12* (2013.01); *G07C 3/00* (2013.01); *H02P 21/20* (2016.02); *H02P 29/00* (2013.01); *G05B 19/4062* (2013.01); *G05B 2219/33218* (2013.01)

(56) References Cited

U.S. PATENT DOCUMENTS

2007/0067678 A1 3/2007 Hosek et al.
2011/0173496 A1 7/2011 Hosek et al.

OTHER PUBLICATIONS

Profibus Nutzerorganisation:"PROFIdrive System Description Technology and Application", Jan. 1, 2011 (Jan. 1, 2011), XP055487196, URL:https://www,automation,com/pdf_articles/profinet/PI_PROFIdrive_SystemDescriptIon_EN_web.pdf (Year: 2011).*
Extended European Search Report dated May 2, 2018 in Patent Application No. 15897184.6.
"Datalogic Absolute Encoders AMT58 EtherCAT", Datalogic Automation, http://www.clrwtr.com/PDF/DataSensor/Datalogic-AMT58-EtherCAT.pdf, XP055467192, 2014, 63 pages.
"PROFIdrive System Description Technology and Application", Profibus Nutzerorganisation, https://www.automation.com/pdf_articles/profinet/PI_PROFIdrive_SystemDescription_EN_web.pdf, XP055467196, 2011, 24 pages.
International Search Report dated Sep. 29, 2015 in PCT/JP2015/069125 filed Jul. 2, 2015.

* cited by examiner

SERVOMOTOR DRIVE DEVICE

TECHNICAL FIELD

The present invention relates to a servomotor drive device with an improved recovery method when an error occurs with an encoder that detects rotation of the servomotor.

BACKGROUND ART

Servomotors are used as drive devices for industrial machines and robots such as component mounters (refer to patent literature 1). Generally, the rotation of a servomotor is detected by an encoder, and in the servo amplifier, a count value (encoder value) of the encoder is compared to an instruction value so as to perform feedback control on the rotation of the servomotor.

CITATION LIST

Patent Literature

Patent literature 1: JP-A-2005-348475

SUMMARY OF INVENTION

Technical Problem

However, if some kind of error occurs during operation of the encoder, the encoder value may become an invalid value, and if the servomotor continues to be driven using this invalid encoder value, a large position deviation may occur with the driving target object, which may lead to a big problem such as mechanical interference. Thus, when an encoder error occurs, power is turned off and then on again.

But, if the power is turned off, the supply of power to the amp control section of the servo amplifier is also cut, which means that, after power is turned on again, it is necessary to re-establish communication between the upper device control section and the amp control section. As a result, when an encoder error occurs, it takes time until recovery to a state in which it is possible to start driving the servomotor.

Solution to Problem

To solve the above problems, the present invention is a servomotor drive device including: an encoder configured to detect rotation of a servomotor that is a driving source for a driving target object; a servo amplifier configured to perform feedback control of the rotation of the servomotor based on a count value (hereinafter referred to as an "encoder value") of the encoder; and an amp control section configured to control operation of the servo amplifier, wherein the amp control section includes a function for sending an initialization instruction for initializing the encoder to the servo amplifier in a state of fixed cycle connection over a servo network between the servo amplifier and the encoder when an error occurs with the encoder, and the servo amplifier includes a function for performing initialization of the encoder without disconnecting the servo network when receiving the initialization instruction sent from the amp control section.

With this configuration, when an error occurs with the encoder, an initialization instruction for initializing the encoder is sent from the amp control section to the servo amplifier in a state of fixed cycle connection over a servo network between the amp control section and the servo amplifier so as to initialize the encoder, therefore, it is possible to quickly initialize the encoder in a state of fixed cycle connection over the servo network between the amp control section and the servo amplifier when an error occurs with the encoder, meaning that it is possible to recover from errors in a short time.

In this case, the servo amplifier may include a function for maintaining a state in which it is possible to determine a state of initialization (pre-initialization, during initialization, initialization complete, initialization failed) of the encoder and an encoder value as encoder information, and the amp control section may include a function for obtaining the state of initialization and the encoder value of the encoder from the servo amplifier and sending the state of initialization of the encoder and the encoder value to an upper device control section. In this manner, it is possible to monitor the state of initialization and the encoder value of the encoder from an upper device control section.

Further, the servo amplifier and the amp control section may include a function for, in a case in which the encoder value is an invalid encoder value, prohibiting the servomotor from being turned on and controlled using the invalid encoder value. In this manner, in a case in which the encoder value is an invalid encoder value, it is possible to reliably prevent driving of the servomotor until recovery to a valid encoder value by normal completion of initialization of the encoder.

DESCRIPTION OF EMBODIMENTS

Figure 1:
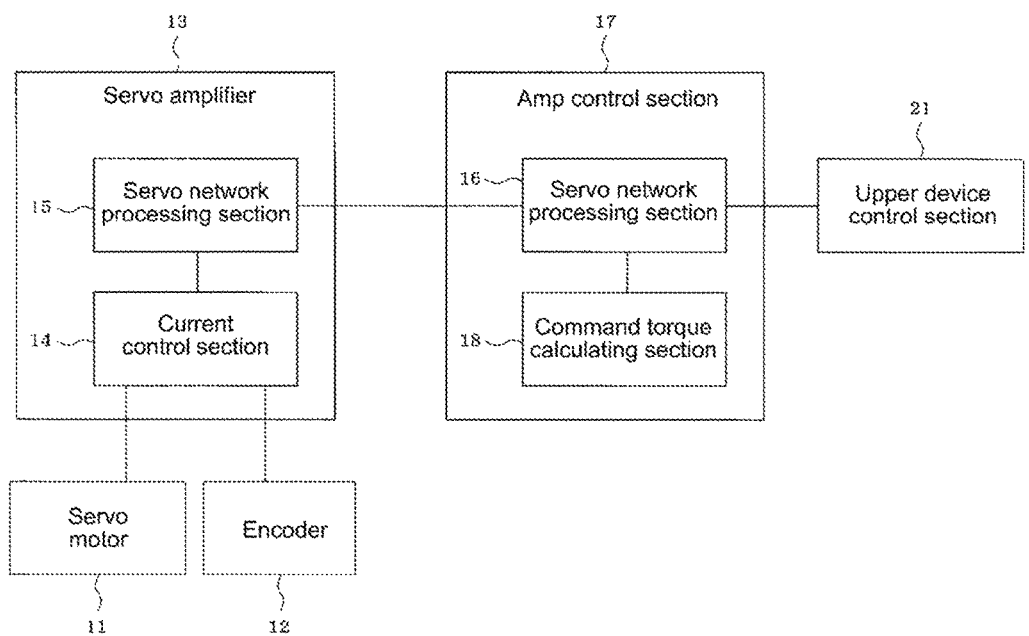
FIG. 1 is a block diagram showing the configuration of a servomotor drive device in an embodiment of the present invention.

An embodiment of the invention is described below. First, the configuration of a servomotor drive device is described based on FIG. 1.

In an industrial machine such as a component mounter, multiple servomotors 11 are loaded as drive sources of driving target objects (in FIG. 1 only one servomotor 11 is shown), and an absolute encoder 12 is provided for detecting a rotation angle (rotation position), rotation speed, rotation direction, and the like, of each servomotor 11. Each servomotor 11 performs feedback control to servo amplifier 13 based on a count value (hereinafter referred to as "encoder value") of encoder 12. In this case, feedback control may be performed by providing one servo amplifier 13 for each of the multiple servomotors 11, or by providing one multi-axis amplifier for multiple servomotors 11.

Items such as current control section 14 for controlling supply of electric current to servomotor 11 and servo network processing section 15 are provided in servo amplifier 13. Servo amplifier 13 is connected to amp control section 17 via the servo network. Items such as servo network processing section 16, and command torque calculating section 18 are provided in amp control section 17. Amp control section 17 is connected to upper device control section 21 via a servo network.

Figure 2:
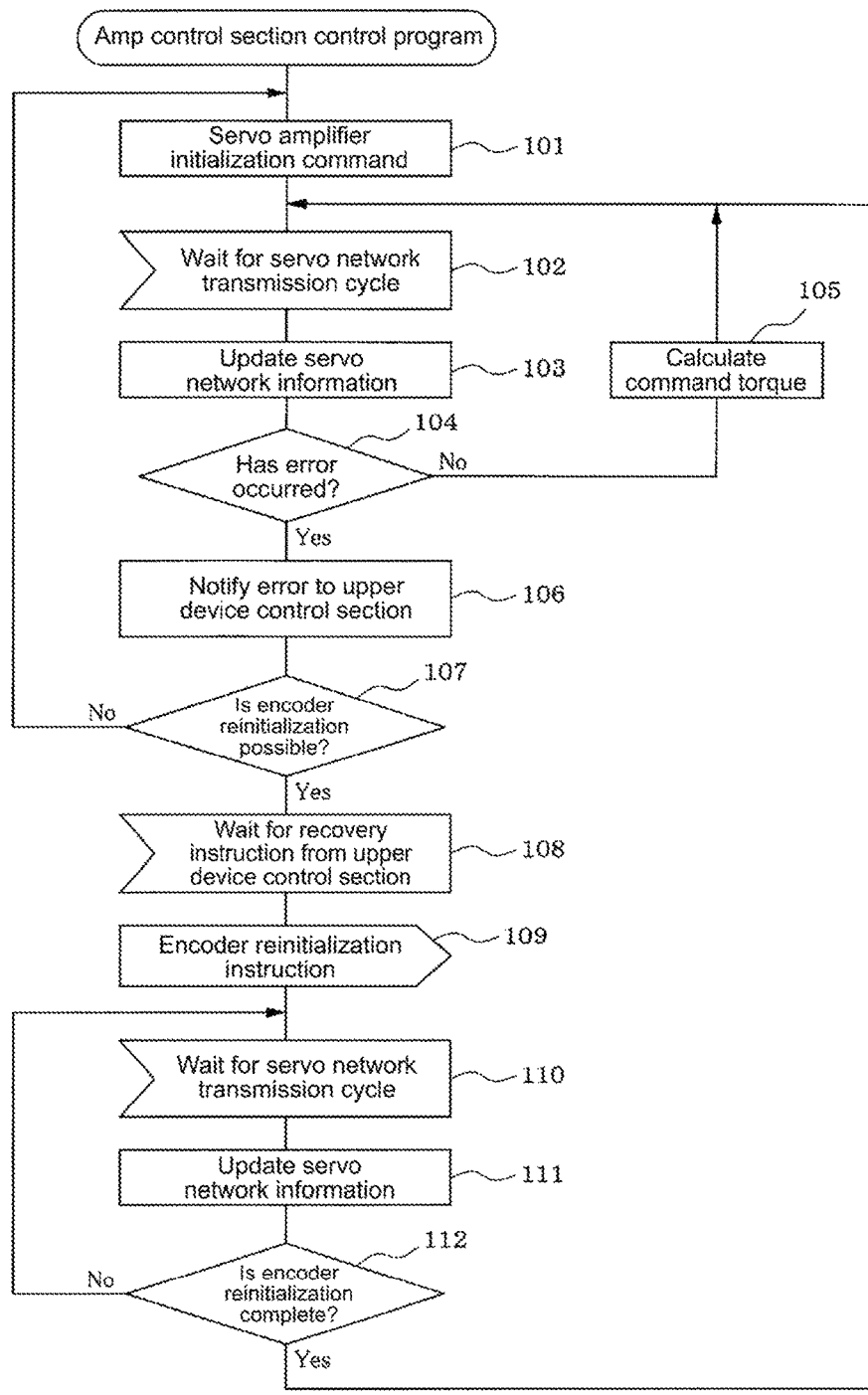
FIG. 2 is a flowchart showing the flow of processing of an amp control section control program.

Here, amp control section 17, by performing the amp control section control program of FIG. 2 described later, when an error occurs with encoder 12, sends an initialization instruction for initializing encoder 23 to servo amplifier 13 in a state of fixed cycle connection over a servo network between amp control section 17 and servo amplifier 13.

Figure 3:
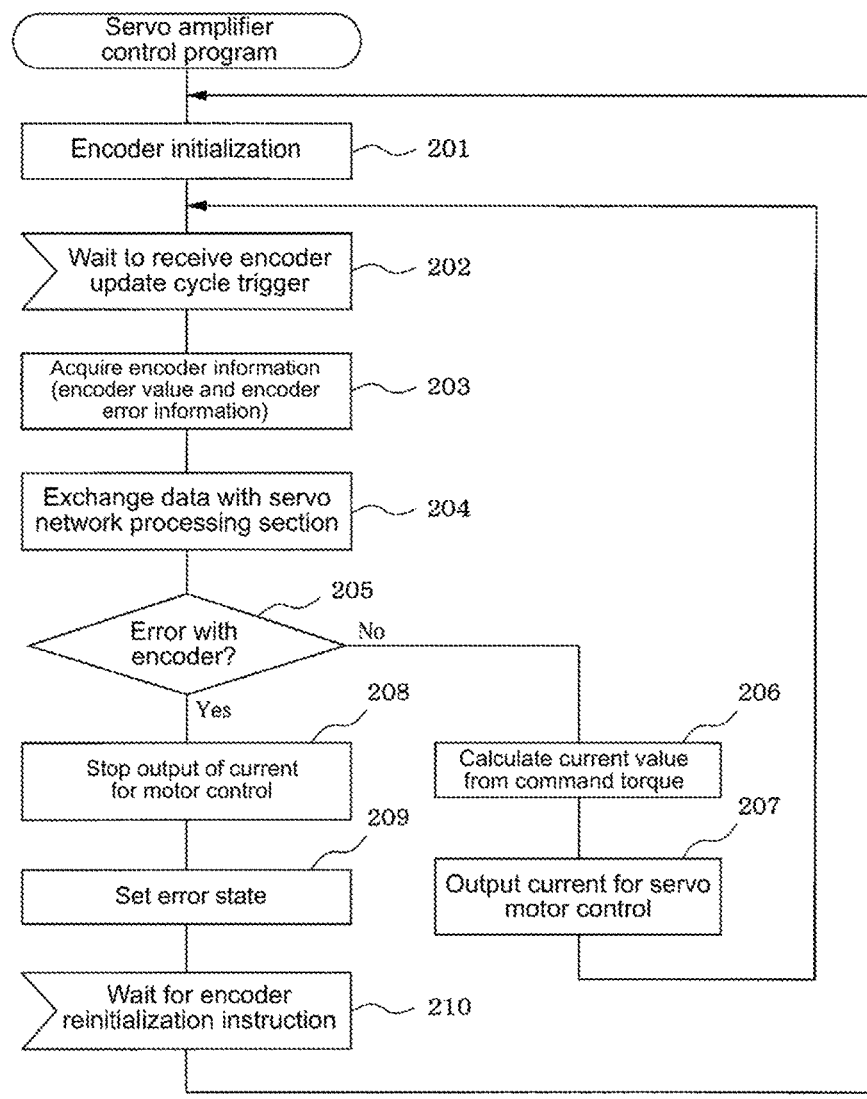
FIG. 3 is a flowchart showing the flow of processing of a servo amplifier control program.

On the other hand, servo amplifier 13, by performing the servo amplifier control program of FIG. 3 described later, when the initialization command sent from amp control section 17 is received, performs initialization of encoder 12 without disconnecting the servo network. Further, servo amplifier 13 memorizes and saves in a rewritable non-volatile memory (not shown) the state of initialization (pre-initialization, during initialization, initialization complete, initialization failed) and the encoder value of encoder 12, and in a case in which the encoder value is an invalid encoder value, prohibits the servo power from being turned on to servomotor 11 and control being performed using the invalid encoder value.

On the other hand, amp control section 17 obtains the state of initialization and the encoder value of encoder 12 from servo amplifier 13 and sends the state of initialization and the encoder value of encoder 12 to upper device control section 21.

Described below are the processing contents of the amp control section control program of FIG. 2 performed by amp control section 17. The amp control section control program of FIG. 2 is performed while power is turned on to amp control section 17. When the program is started, first, in step 101, an initialization command for initializing encoder 12 is sent to servo amplifier 13 in a state a fixed cycle connection over a servo network between amp control section 17 and servo amplifier 13. Here, whether it is possible to reinitialize encoder 12 (whether encoder 12 supports reinitialization) is asked of servo amplifier 13.

In step 102, after standing by until the transmission cycle of the servo network, continuing to step 103, the servo network information is updated. Here, the command torque calculated in command torque calculating section 18 is set in the servo network send data, and the state of initialization (one state out of pre-initialization, during initialization, initialization complete, initialization failed) and the encoder value of encoder 12 are obtained as encoder information from servo amplifier 13 via the servo network. The encoder value becomes an invalid encoder value for pre-initialization and initialization failed.

Then, continuing to step 14, it is determined whether an error has occurred with encoder 12, and if an error has not occurred, continuing to step 105, a command value is calculated in command torque calculating section 18, and processing returns to step 102. By this, while power is on to amp control section 17, if no error has occurred for encoder 12, updating of servo network information over the servo network transmission cycle and calculating of command torque are repeated.

Then, when an error occurs with encoder 12, continuing to step 106, upper device control section 21 is notified of the error of encoder 12 from amp control section 17. Then, continuing to step 107, it is determined whether reinitialization of encoder 12 is possible, and if reinitialization of encoder 12 is not possible, processing returns to step 101, and the above processing is repeated.

In contrast, if reinitialization of encoder 12 is possible, continuing to step 108, processing stands by until a recovery instruction is received from upper device control section 21. When the recover instruction is received from upper device control section 21, processing continues to step 109, and reinitialization of encoder 12 is instructed to servo amplifier 13.

Then, continuing to step 110, after standing by until the transmission cycle of the servo network, continuing to step 111, the servo network information is updated. Here, the reinitialization completion state of encoder 12 is checked via the servo network. In step 112, it is determined whether reinitialization of encoder 12 is complete, and processing of updating the servo network information is repeated by the servo network transmission cycle until reinitialization of encoder 12 is complete. Then, when reinitialization of encoder 12 is complete, processing returns to step 102 and is repeated from there. By such processing, in a case in which an encoder value is an invalid encoder value due to an error of encoder 12, servo power is prevented from being turned on to servomotor 11 until recovery to a valid encoder value by normal completion of initialization of encoder 12.

Described next are the processing contents of the servo amplifier control program of FIG. 3 performed by servo amplifier 13. The servo amplifier control program of FIG. 3 is performed while power is turned on to servo amplifier 13. When the program is started, first, in step 201, initialization of encoder 12 is performed.

Then, in step 202, processing stands by until receipt of a trigger of the updating cycle of encoder 12. An internal trigger for encoder 12 to perform updating is issued in a regular cycle. After receipt of the trigger, encoder 12 is in a state of initialization complete. When the trigger is received, continuing to step 203, encoder information (encoder value, encoder error information, and so on) is obtained from encoder 12.

Then, continuing to step 204, data exchange is performed with servo network processing section 15 of servo amplifier 13. Here, data that current control section 14 of servo amplifier 13 obtains from servo network processing section 15 is a command torque, and on the other hand, data that servo network processing section 15 of servo amplifier 13 obtains from current control section 14 is an encoder value, information of errors that are occurring (encoder errors and the like), and the state of initialization of encoder 12 (pre-initialization, during initialization, initialization complete).

Then, in step 205, it is determined whether an error has occurred with encoder 12, and if an error has not occurred with encoder 12, continuing to step 206, a current value is calculated from the command torque, and, continuing to step 207, the current value calculated from the command torque is output to servomotor 11, then, returning to step 202, the above processing is repeated. By this, while power is turned on to servo amplifier 13, if an error has not occurred with encoder 12, processing of converting the command torque is to a current value in the update cycle of encoder 12 and outputting to servomotor 11 is repeated.

Then, when an error occurs with encoder 12, continuing to step 208, the output of current for controlling the servomotor is stopped, and in step 209, an error state is set. By this, when an error occurs with encoder 12, the state of initialization of encoder 12 transitions to a pre-initialization state. Then, continuing to step 210, processing stands by until an encoder 12 reinitialization instruction is received from amp control section 17, and when the reinitialization instruction is received, returning to step 201, the above processing is repeated. By such processing, in a case in which an encoder value is an invalid encoder value due to an error of encoder 12, servo power is prevented from being turned on to servomotor 11 until recovery to a valid encoder value by normal completion of initialization of encoder 12.

According to an embodiment described above, when an error occurs with encoder 12, an initialization instruction for initializing encoder 23 is sent from amp control section 17 to servo amplifier 13 in a state of fixed cycle connection over a servo network between amp control section 17 and servo amplifier 11 so as to initialize encoder 12, therefore, it is possible to quickly initialize encoder 12 in a state of fixed cycle connection over the servo network between amp control section 17 and servo amplifier 13 when an error occurs with encoder 12, meaning that it is possible to recover from errors in a short time.

Note that, the present invention is not limited to the embodiments described above and it goes without saying that various embodiments with changes that do not extend beyond the scope of the invention are possible, such as that suitable changes may be made to the configuration of servo amplifier 13 and amp control section 17.

REFERENCE SIGNS LIST

11: servomotor; 12: encoder; 13: servo amplifier; 14: current control section; 15, 16: servo network processing section; 17: amp control section; 18: command torque calculating section; 21: upper device control section

The invention claimed is:

1. A servomotor drive device comprising:
an encoder configured to detect rotation of a servomotor that is a driving source for a driving target object;
a servo amplifier configured to perform feedback control of the rotation of the servomotor based on an encoder value of the encoder; and
an amp control section configured to control operation of the servo amplifier, wherein
the amp control section is configured to:
    determine whether or not an error has occurred with the encoder;
    when it is determined that the error has not occurred with the encoder: calculate a command value for controlling the servomotor; and
    when it is determined that the error has occurred with the encoder: instead of calculating the command value, send an initialization instruction for initializing the encoder to the servo amplifier in a state of fixed cycle connection over a servo network between the servo amplifier and the encoder, and
the servo amplifier is configured to:
    perform initialization of the encoder without disconnecting the servo network when receiving the initialization instruction sent from the amp control section.

2. The servomotor drive device according to claim 1, wherein
the servo amplifier is configured to maintain a state of initialization of the encoder and the encoder value, and
the amp control section is configured to:
    obtain the state of initialization and the encoder value from the servo amplifier; and
    send the state of initialization and the encoder value to an upper device control section.

3. The servomotor drive device according to claim 2, wherein the servo amplifier is configured to prohibit the servomotor from being turned on and controlled when the encoder value is an invalid encoder value.

4. The servomotor device according to claim 3, wherein the encoder value is set to the invalid encoder value when the state of initialization is one of a pre-initialization state and an initialization failed state.

5. The servomotor device according to claim 3, wherein the state of initialization is selected from a pre-initialization state, a state of during initialization, a state of initialization complete, and an initialization failed state.

6. The servomotor drive device according to claim 2, wherein the amp control section is configured to wait for a recovery instruction from the upper device controls section before sending the initialization instruction.

7. The servomotor drive device according to claim 1, wherein the servo amplifier is configured to:
    determine whether or not the error has occurred with the encoder;
    when it is determined that the error has not occurred with the encoder: calculate a current value based upon the command value and output the current value to the servo motor; and
    when it is determined that the error has occurred with the encoder: prohibit the servomotor from being turned on and controlled.

8. The servomotor drive device according to claim 7, wherein the servo amplifier is configured to wait for the initialization instruction when it is determined that the error has occurred.

9. The servomotor device according to claim 1, wherein the amp control section is configured to send the initialization instruction when it is determined that re-initialization of the encoder is possible.

10. The servomotor drive device according to claim 1, wherein the amp control section is configured to determine whether or not initialization of the encoder is complete.

11. The servomotor drive device according to claim 10, wherein the amp control section is configured to:
    when it is determined that the initialization of the encoder is complete and the error no longer occurs: calculate the command value; and
    when it is determined that the initialization of the encoder is not complete: await the completion of the initialization of the encoder.

12. The servo motor drive device according to claim 1, wherein without disconnecting the servo network includes without disconnecting a power supply.

* * * * *